United States Patent Office 3,301,852
Patented Jan. 31, 1967

3,301,852
1-HYDROXYMETHYL-COLCHICINE AND
DERIVATIVES THEREOF
Georges Muller, Nogent-sur-Marne, and Roland Bardoneschi, Le Vert-Galant, France, assignors to Roussel-U.C.L.A.F., Paris, France, a corporation of France
No Drawing. Filed Oct. 1, 1963, Ser. No. 312,890
Claims priority, application France, Oct. 11, 1962, 911,957; Nov. 9, 1962, 914,928; Dec. 4, 1962, 917,511; Jan. 10, 1963, 921,004, 921,005; Feb. 8, 1963, 924,190; Mar. 1, 1963, 926,512
17 Claims. (Cl. 260—247.2)

The invention relates to novel 1-hydroxymethyl colchicine derivatives having the formula

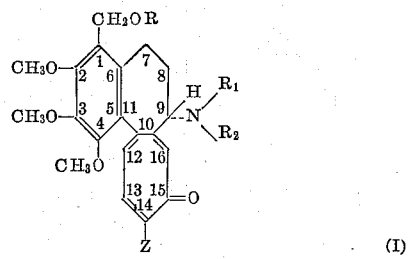

(I)

wherein R is selected from the group consisting of hydrogen, an alkyl radical having 1 to 3 carbon atoms and an acyl radical of an organic carboxylic acid or carbonic acid having 1 to 18 carbon atoms, $R_1$ is selected from the group consisting of hydrogen and an alkyl radical having 1 to 3 carbon atoms, $R_2$ is selected from the group consisting of hydrogen and an acyl radical of an organic carboxylic acid having 1 to 24 carbon atoms and Z is selected from the group consisting of —$OCH_3$, —$OCH_2$—$CH_3$, —$SCH_3$, —$SCH_2$—$CH_3$, and

wherein R' and R" are selected from the group consisting of hydrogen, alkyl radicals having 1 to 8 carbon atoms, aryl radicals and aralkyl radicals and R' and R" together with the nitrogen atom may be a 5 or 6 membered heterocyclic group such as morpholine, piperidine, etc. The invention also relates to a novel process for the preparation of the said colchicine derivatives. The invention also relates to novel antimitotic compositions and to a method of modifying mitosis.

The novel colchicine derivatives of Formula I possess interesting biological activity, particularly a remarkable antimitotic activity. They are useful in commercial agriculture for modification of mitosis and the creation of poly-ploides by applying aqueous solutions or suspensions of the said derivatives to cultivated soil or by treating seeds before planting with the said products per se or solutions thereof. In addition, the derivatives of Formula I are also useful as intermediates for the preparation of other derivatives of colchicine.

It is an object of the invention to provide novel colchicine derivatives of Formula I.

It is another object of the invention to provide a novel process for the preparation of colchicine derivatives of Formula I.

It is a further object of the invention to provide novel intermediates for the colchicine derivatives of Formula I.

It is an additional object of the invention to provide novel antimitotic compositions.

It is another object of the invention to provide a novel method of modifying mitosis.

These and other objects and advantages of the invention will become obvious from the following detailed description.

The novel colchicine derivatives of the invention have the formula

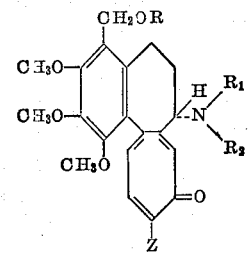

wherein R is selected from the group consisting of hydrogen, an alkyl radical having 1 to 3 carbon atoms, an acyl radical of an organic carboxylic acid having 1 to 18 carbon atoms and an acyl radical of an organic carbonic acid having 1 to 18 carbon atoms, $R_1$ is selected from the group consisting of hydrogen and an alkyl radical having 1 to 3 carbon atoms, $R_2$ is selected from the group consisting of hydrogen and an acyl radical of an organic carboxylic acid having 1 to 24 carbon atoms and Z is selected from the group consisting of —$OCH_3$, $OCH_2$—$CH_3$, —$SCH_3$, —$SCH_2$—$CH_3$ and $$N\begin{matrix}R'\\R''\end{matrix}$$

wherein R' and R" are selected from the group consisting of hydrogen, alkyl radicals having 1 to 8 carbon atoms, aryl radicals and aryl alkyl radicals and R' and R" together with the nitrogen atom are 5 to 6 membered heterocyclic radicals.

The compounds of the invention have been numbered according to the accepted numbering system for colchicine. However, the compounds can also be numbered by system RRI 3923 of the Ring Index, 2nd edition, 1960 according to the formula According to this system, the compounds of the invention would be considered to be 4-hydroxymethyl colchicine derivatives.

The acyl radical of the organic carboxylic acid having 1 to 24 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecyclic acid, lauric acid, myristic acid, palmitic acid and stearic acid; alkenoic acids such as undecylenic acid, linoleic acid, ricinoleic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as p-phenyl benzoic acid, p-cyclohexyl benzoic acid, benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-keto-alkanoic acids, such as acetylacetic acid, propionylacetic acid and butyrylacetic acid, amino acids such as diethylaminoacetic acid and aspartic acid.

The novel process of the invention for the preparation of the colchicine derivatives of Formula I comprises reducing a 1-formyl colchicine having the formula

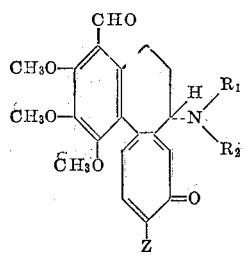

wherein $R_1$, $R_2$ and Z have the above definitions with an alkali metal borohydride such as potassium or sodium borohydride in an inert organic solvent such as a lower alkanol, preferably methanol, or an aliphatic or cyclic ether such as tetrahydrofuran to form the corresponding 1-hydroxymethyl colchicine derivative which can be esterified, etherified or used to form the mixed carbonate. The reduction is preferably effected at room temperature.

The 1-formyl colchicine derivatives may be prepared according to commonly-assigned copending U.S. application Serial No. 279,610 filed May 10, 1963, now Patent No. 3,194,835, by reacting 1,1-dichloromethyl methyl ether with the proper colchicine derivative in the presence of stannic chloride or aluminum chloride followed by the addition of water.

A variation of the process of the invention for the preparation of the colchicine derivatives of Formula I wherein Z is

comprises reacting 1-hydroxymethyl colchicine with ammonia or a primary or secondary amine or with a cyclic secondary amine in an aqueous media, preferably at room temperature, to form the corresponding 1-hydroxymethyl colchiceinamide which can be esterified or etherified.

Another variation of the process of the invention for the preparation of the colchicine derivatives of Formula I wherein Z is —$SCH_3$ or —$SCH_2$—$CH_3$ comprises reacting 1-hydroxymethyl colchicine with methyl or ethyl mercaptan in the absence or presence of an organic solvent such as chloroform or tetrahydrofuran in the presence of an acid catalyst such as p-toluene sulfonic acid or with an aqueous solution of an alkali metal salt such as sodium, lithium or potassium of methyl mercaptan or ethyl mercaptan in the presence or absence of an organic solvent such as methanol, ethanol, tetrahydrofuran, dioxane, etc. to form the corresponding 1-hydroxymethyl thiocolchicine.

The novel colchicine derivatives of Formula I besides being useful in commercial agriculture and as colchicine intermediates possess interesting pharmacological properties, particularly an important antimitotic activity.

The novel antimitotic compositions are comprised of a colchicine derivative having the formula

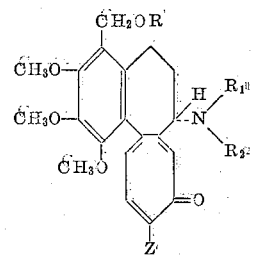

wherein R is selected from the group consisting of hydrogen, an alkyl radical having 1 to 3 carbon atoms, an acyl radical of an organic carboxylic acid having 1 to 18 carbon atoms and an acyl radical of an organic carbonic acid having 1 to 18 carbon atoms, $R_1$ is selected from the group consisting of hydrogen and an alkyl radical having 1 to 3 carbon atoms, $R_2$ is selected from the group consisting of hydrogen and an acyl radical of an organic carboxylic acid having 1 to 24 carbon atoms and Z is selected from the group consisting of —$OCH_3$, $OCH_2$—$CH_3$, —$SCH_3$, —$SCH_2$—$CH_3$, and

wherein R′ and R″ are selected from the group consisting of hydrogen, alkyl radicals having 1 to 8 carbon atoms, aryl radicals and aryl alkyl radicals and R′ and R″ together with the nitrogen atom are 5 to 6 membered heterocyclic radicals and a major amount of a pharmacological carrier. The compositions may be prepared in the form of injectable oily solutions or suspensions or sterile powders to be prepared just before use in an appropriate solvent, prepared in ampules, in multiple dose flacons or in the form of tablets, coated tablets and pomades prepared in the usual manner.

The novel method of the invention of modifying mitosis comprises administering an effective amount of a colchicine derivative of the formula

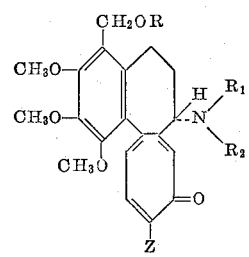

wherein R is selected from the group consisting of hydrogen, an alkyl radical having 1 to 3 carbon atoms, an acyl radical of an organic carboxylic acid having 1 to 18 carbon atoms and an acyl radical of an organic carbonic acid having 1 to 18 carbon atoms, $R_1$ is selected from the group consisting of hydrogen and an alkyl radical having 1 to 3 carbon atoms, $R_2$ is selected from the group consisting of hydrogen and an acyl radical of an organic carboxylic acid having 1 to 24 carbon atoms and Z is selected from the group consisting of —$OCH_3$, $OCH_2$—$CH_3$, —$SCH_3$, —$SCH_2$—$CH_3$, and

wherein R′ and R″ are selected from the group consisting of hydrogen, alkyl radicals having 1 to 8 carbon atoms, aryl radicals and aryl alkyl radicals and R′ and R″ together with the nitrogen atom are 5 to 6 membered heterocyclic radicals. The said colchicine may be administered orally, transcutaneously or topically.

The usual useful daily dosage will vary depending upon the method of administration and the specific product. For example, the usual daily dosage in the adult is 5 to 50 mg. for the acetate of 1-hydroxymethyl colchicine, 2 to 50 mg. for 1-hydroxymethyl N-methyl colchiceinamide, 5 to 50 mg. for 1-hydroxymethyl colchicine and 5 to 100 mg. for 1-hydroxymethyl thiocolchicine, 1-methoxymethyl N-desacetyl thiocolchicine and 1-methoxymethyl thiocolchicine.

In the following examples there are described several preferred embodiments to illustrate the invention. However, it should be understood that the invention is not intended to be limited to the specific embodiments.

EXAMPLE I

Preparation of 1-hydroxymethyl colchicine

Step A: Preparation of 1-formyl colchicine.—1.02 g. of colchicine were dissolved in 10 cc. of methylene chloride and 0.8 cc. of stannic chloride was added thereto. The formation of an abundant yellow precipitate was observed and the reaction temperature increased to 50° C. Then the reaction temperature was cooled to room temperature and 2.5 cc. of 1,1-dichloromethyl methyl ether were added thereto. The precipitate changed color and became red. The reaction mixture was allowed to stand for a period of 2 hours at room temperature and then some water and some methylene chloride were added. The reaction mixture was triturated in order to decompose the complex formed and the mixture was then extracted with methylene chloride. The extract was washed with water and evaporated to dryness under vacuum to obtain 1.10 g. (yield: 70–80%) of raw 1-formyl colchicine which upon crystallization from ethyl acetate had an instantaneous melting point of 250° C.

The product occurred in the form of colorless crystals which were soluble in chloroform, slightly soluble in ethyl acetate and insoluble in water and ether.

Analysis.—$C_{23}H_{25}O_7N$: Molecular weight=427.44. Calculated: C, 64.62%; H, 5.90%; N, 3.28%. Found: C, 64.4%; H, 6.0%; N, 3.2%.

Step B: Preparation of 1-hydroxymethyl colchicine.—16.5 g. of 1-formyl colchicine were dissolved in 165 cc. of methanol and 1.65 g. of potassium borohydride were added. The reaction mixture was agitated for a period of three hours at room temperature and then was brought to a pH of 5 by the addition of acetic acid. The acidified reaction mixture was poured into water and the aqueous phase was extracted with methylene chloride. The extract was washed with water, dried over magnesium sulfate and evaporated to dryness under vacuum. After crystallization from ethyl acetate, 3.5 g. of 1-hydroxymethyl colchicine having a melting point of 255° C. were obtained.

The mother liquors were saturated with sodium chloride and extracted with methylene chloride containing 15% of methanol. The extracts were washed, dried over magnesium sulfate and evaporated to dryness under vacuum. After crystallization from ethyl acetate, 6.62 g. of 1-hydroxymethyl colchicine having a melting point of 258° C. were obtained. Pure 1-hydroxymethyl colchicine obtained by crystallization from the mixture of methylene chloride and ethyl acetate had a melting point of 260° C. and a specific rotation $[\alpha]_D^{20}=-100\pm2°$ C. (c.=0.5% in chloroform).

The product occurred in the form of clear yellow crystals which were slightly soluble in water, soluble in alcohol, chloroform and acetone and insoluble in ether and benzene.

Analysis.—$C_{23}H_{27}O_7N$: Molecular weight=429.45. Calculated: C, 64.32%; H, 6.34%; N. 3.26%. Found: C, 64.2%; H, 6.4%; N, 3.5%.

The product is not described in the literature.

EXAMPLE II

Preparation of 1-hydroxymethyl thiocolchicine

Step A: Preparation of 1-formyl thiocolchicine.—1.19 g. of thiocolchicine were dissolved in 8 cc. of methylene chloride and 0.8 cc. of stannic chloride were added thereto. This addition produced a solidification of the mass of the reaction mixture which became red and the reaction temperature increased to 50° C. The reaction mixture was cooled to room temperature and 2.5 cc. of 1,1-dichloromethyl methyl ether were added thereto. The mixture was allowed to react for a period of three hours and an evolution of hydrochloric acid was observed. Thereafter, the reaction mixture was poured onto ice and triturated with water and methylene chloride. The aqueous phase was separated and was extracted with methylene chloride. The combined extracts were washed with water and sodium bicarbonate, filtered and evaporated to dryness under vacuum to obtain 1.21 g. of 1-formyl thiocolchicine. The product was characterized by formation of the oxime or of the semicarbazone followed by pyruvic or hydrochloric acid hydrolysis.

Step B: Preparation of 1-hydroxymethyl thiocolchicine.—After 1 g. of 1-formyl thiocolchicine was dissolved in 10 cc. of methanol, the solution was cooled to +5° C. and 0.1 g. of sodium borohydride was added slowly. The reaction mixture was maintained under agitation for a period of one hour at +5° C. Thereafter, the mixture was acidified to a pH of 6–7 with acetic acid and poured into water. The aqueous phase was extracted with methylene chloride and the extract was washed with water, dried over magnesium sulfate and evaporated to dryness under vacuum to obtain 1 g. of 1-hydroxymethyl thiocolchicine.

EXAMPLE III

Preparation of 1-hydroxymethyl thiocolchicine 6.5 g. of 1-hydroxymethyl colchicine were dissolved in 65 cc. of a 1:1 mixture of ethanol and water. 6.5 g. of the sodium salt of methyl mercaptan were added and the reaction mixture was allowed to stand for a period of 18 hours at room temperature. The solution took a dark red coloration and the reaction mixture was then poured into water containing sodium chloride. The solution was brought to a pH of 5 by addition of acetic acid and the aqueous phase was extracted with methylene chloride. The extract was washed with N/2 sodium hydroxide solution with water containing sodium chloride, dried over magnesium sulfate and evaporated to dryness in vacuum to obtain 6.8 g. of raw 1-hydroxymethyl thiocolchicine. The product was triturated with ether and a powder melting at 150° C. and having a specific rotation $[\alpha]_D^{20}=-126°\pm2°$ (c.=0.6% in chloroform) was obtained by vacuum filtration.

The product occurred in the form of a yellow amorphous powder which was soluble in alcohol, acetone and chloroform and insoluble in water, ether and benzene.

Analysis.—$C_{23}H_{27}O_6NS$: Molecular weight=445.52. Calculated: C, 62.01%; H, 6.11%; N, 3.14%; S, 7.18%. Found: C, 61.8%; H, 5.9%; N, 3.2%; S, 7.0%.

The product is not described in the literature.

EXAMPLE IV

Preparation of 1-methoxymethyl thiocolchicine

Step A: Preparation of 1-methoxymethyl N-desacetyl thiocolchicine.—4 g. of raw 1-hydroxymethyl thiocolchicine obtained according to Example III were dissolved in 80 cc. of methanol. 80 cc. of hydrochloric acid were added and the reaction mixture was heated to reflux for a period of 18 hours. The reaction mixture was cooled and brought to a pH of 10 by the addition of ammonium hydroxide solution. After sodium chloride was added, the reaction mixture was poured into water and the aqueous phase was extracted with methylene chloride. The extract was washed with water, dried over magnesium sulfate and evaporated to dryness under vacuum. The residue was dissolved in methylene chloride and passed through a column of alumina. A first fraction was obtained by elution with methylene chloride and a second fraction by elution with methylene chloride containing 1% of methanol. After crystallization from a mixture of methylene chloride and isopropyl ether, 1-methoxymethyl N-desacetyl thiocolchicine having a melting point of 165° C. and a specific rotation $[\alpha]_D^{20} = -101° \pm 3°$ (c.=0.35% in chloroform) was obtained.

The product occurred in the form of clear yellow needles which were soluble in dilute aqueous acids, alcohol, acetone and chloroform, and insoluble in water, ether and benzene.

Analysis.—$C_{22}H_{27}O_5NS$: Molecular weight=417.51. Calculated: C, 63.30%; H, 6.52%; N, 3.36%; S, 7.66%. Found: C, 63.1%; H, 6.5%; N, 3.2%; S, 7.8%.

The product is not described in the literature.

*Step B: Preparation of 1-methoxymethyl thiocolchicine.*—400 mg. of 1-methoxymethyl N-desacetyl thiocolchicine were dissolved in 4 cc. of pyridine. 2.5 cc. of acetic anhydride were added and the reaction mixture was allowed to stand for a period of 18 hours at room temperature. 1 cc. of water was added thereto, and the mixture was agitated for a period of one hour and poured onto ice. The pH was brought to 1 by the addition of hydrochloric acid and the solution was saturated with sodium chloride and extracted with methylene chloride. The extract was washed with water and sodium bicarbonate, dried over magnesium sulfate and evaporated to dryness under vacuum. After crystallization from a mixture of ethyl acetate and isopropyl ether, 350 mg. of 1-methoxymethyl thiocolchicine having a melting point of 195° C. and a specific rotation $[\alpha]_D^{20} = -154° \pm 5°$ (c.=0.2% in chloroform) were obtained.

The product occurred in the form of clear yellow crystals which were soluble in alcohol, acetone and chloroform and insoluble in water, ether and benzene.

Analysis. — $C_{24}H_{29}O_6NS$: Molecular weight=459.55. Calculated: C, 62.73%; H, 6.36%; N, 3.05%; S, 6.98%. Found: C, 62.3%; H, 6.6%; N, 2.7%; S, 6.9%.

The product is not described in the literature.

EXAMPLE V

*Preparation of the formate of 1-hydroxy methyl colchicine*

1 g. of 1-hydroxymethyl colchicine was dissolved in 2.5 volumes of pure formic acid and the solution was allowed to stand for 2 hours at 60° C. The reaction mixture was poured into water and the aqueous phase was extracted with methylene chloride. The extract was washed with water, with a saturated solution of sodium bicarbonate and with water and then was dried over sodium sulfate. The dried extract was filtered and evaporated to dryness under vacuum. The residue was crystallized from a mixture of acetone and ether to obtain a 60% yield of the formate of 1-hydroxymethyl colchicine having a melting point of 194° C. and a specific rotation $[\alpha]_D^{20} = -83° \pm 2°$ (c.=0.5% in chloroform).

This compound is not described in the literature.

In an analogous manner, the formate of 1-hydroxymethyl thiocolchicine having a melting point of 160° C. and a specific rotation $[\alpha]^{20} = -166° \pm 4°$ (c.=0.2% in chloroform) was obtained in a yield of 50%.

This compound is not described in the literature.

EXAMPLE VI

*Preparation of the acetate of 1-hydroxymethyl thiocolchicine*

1 g. of 1-hydroxymethyl thiocolchicine was dissolved in 5 cc. of pyridine and after 2 cc. of acetic anhydride were added thereto, the reaction mixture was allowed to stand at room temperature for a period of 18 hours. Then, the reaction mixture was poured into water and the aqueous phase was extracted with methylene chloride. The extract was washed with N-hydrochloric acid, with water and with a saturated solution of sodium bicarbonate. After drying over magnesium sulfate the extract was evaporated to dryness under vacuum and the residue was crystallized from a mixture of ethyl acetate and ether to obtain a 90% yield of the acetate of 1-hydroxymethyl thiocholchicine having a melting point of 238° C. and a specific rotation $[\alpha]_D^{20} = -163° \pm 2°$ (c.=0.4% in chloroform).

This compound is not described in the literature.

In an analogous manner, the acetate of 1-hydroxymethyl colchicine having a melting point of 162° C. and a specific rotation $[\alpha]_D^{20} = -107° \pm 2°$ (c.=0.35% in chloroform) was prepared with a yield of 96%. The product occurred in the form of colorless needles which were soluble in alcohol, acetone, benzene and chloroform, very slightly soluble in ether and insoluble in water.

This compound is not described in the literature.

By operating according to the methods described above, but by utilizing propionic acid anhydride in place of acetic acid anhydride, the propionate of 1-hydroxymethyl colchicine having a melting point of 190° C. and a specific rotation $[\alpha]_D^{20} = -100° \pm 2°$ (c.=0.5% in chloroform) was prepared with a yield of 90%. Likewise, the propionate of 1-hydroxymethyl thiocolchicine having a melting point of 210° C. and a specific rotation $[\alpha]_D^{20} = -167° \pm 4°$ (c.=0.3% in chloroform) was prepared with a yield of 80%.

These compounds are not described in the literature.

EXAMPLE VII

*Preparation of the hexahydrobenzoate of 1-hydroxymethyl colchicine*

1.5 g. of 1-hydroxymethyl colchicine were introduced into 15 cc. of pyridine and after the solution was cooled to —20° C., 3 cc. of hexahydrobenzoyl chloride were added drop by drop. The reaction mixture was agitated at —5° C. for a period of one hour and a half and then was poured into a solution of sodium bicarbonate and extracted with methylene chloride. The extract was washed successively with water, with N hydrochloric acid and with water, dried and evaporated to dryness under vacuum. By crystallization of the residue from ether, the hexahydrobenzoate of 1-hydroxymethyl colchicine having a melting point of 216° C., and a specific rotation $[\alpha]_D^{20} = -84.2° \pm 1.5°$ (c.=0.5% in chloroform) was obtained in a yield of 92%.

This compound is not described in the literature.

EXAMPLE VIII

*Preparation of the mixed carbonate of hexahydrobenzyl alcohol and 1-hydroxymethyl colchicine*

1 g. of 1-hydroxymethyl colchicine was dissolved in 5 cc. of pyridine and after the solution was cooled to —12° C. 1 cc. of hexahydrobenzyl chloroformate was added dropwise while agitating. The temperature was allowed to rise to 20° C. and the reaction mixture was allowed to stand for three hours. Thereafter, the reaction mixture was poured onto ice and acidified with hydrochloric acid to a pH of 1. The acidified aqueous phase was extracted with methylene chloride and the extract was washed with water and distilled. 1.9 g. of resin were obtained which was subjected to chromatography through alumina. The column was eluted with methylene chloride whereby 460 mg. of resin were obtained and then the column was eluted with methylene chloride containing 0.5% of methanol, whereby 60 mg. of impurities were obtained. Thereafter, the column was eluted with methylene chloride containing 1% of methanol to obtain 1.36 g. of a residue in several fractions. This residue was crystallized from ether to obtain 800 mg. of a product having a melting point of 154–156° C. After recrystallization from methylene chloride and ether with concentration, 674 mg. of the mixed carbonate of hexahydrobenzyl alcohol and 1-hydroxymethyl colchicine having a melting point of 160° C. were obtained.

This compound is not described in the literature.

EXAMPLE IX

*Preparation of 1-hydroxymethyl colchiceinamide*

*Step A: Preparation of 1-formyl colchiceinamide.—* 2 g. of colchiceinamide having a slow melting point of 262° C., were mixed with 20 cc. of methylene chloride and 4 cc. of 1,1-dichloromethyl methyl ether and then 1.6 cc. of stannic chloride were added thereto. The reaction mixture was triturated from time to time for a period of 4 hours. Thereafter, it was decomposed with water and methylene chloride. The aqueous phase was separated and extracted three times with methylene chloride. The extracts were washed with water and distilled to dryness. The residue taken up with ethyl acetate furnished 1.1 g. of 1-formyl colchiceinamide having a melting point of 284° C. and a specific rotation $[\alpha]_D^{20} = -40°$ (c.=0.5% in chloroform).

The product was soluble in ethanol, slightly soluble in chloroform and insoluble in water, ether, acetone and benzene.

*Analysis.* — $C_{22}H_{24}O_6N_2$: Molecular weight=412.42. Calculated: C, 64.06%; H, 5.87%; N, 6.79%. Found: C, 64.0%; H, 6.0%; N, 6.3%.

The product is not described in the literature.

This compound was also obtained by treatment of 1-formyl colchicine with aqueous ammonia in the following manner:

1 g. of 1-formyl colchicine was dissolved in 10 cc. of methanol and 25 cc. of concentrated ammonium hydroxide solution were added thereto. The reaction mixture was allowed to stand at room temperature for a period of 40 hours, and thereafter was poured into water. The aqueous phase was extracted with methylene chloride and the extract was washed with water, dried over magnesium sulfate and evaporated to dryness under vacuum. The residue was dissolved in methylene chloride and subjected to chromatography through 30 g. of alumina. The column was eluted with methylene chloride containing 1% of methanol to obtain 350 mg. of raw product. After purification, pure 1-formyl colchiceinamide was obtained identical to the product described above.

*Step B: Preparation of 1-hydroxymethyl colchiceinamide.—* 1 g. of 1-formyl colchiceinamide was treated in 20 cc. of methanol at +10° C. with 100 mg. of potassium borohydride for a period of 20 minutes and the reaction mixture was then agitated for 2 hours at room temperature. Acetic acid was added thereto until a pH of 5 was obtained. The reaction mixture was poured into water and the aqueous phase was extracted with methylene chloride and the extract was washed with water and distilled to dryness. The residue was crystallized from a mixture of methanol and ether to obtain 520 mg. (52% yield) of 1-hydroxymethyl colchiceinamide having a melting point of 238–240° C. and a specific rotation $$[\alpha]_D^{20} = -157° \pm 7°$$

(c.=0.15% in chloroform).

The product occurred in the form of clear yellow crystals which were slightly soluble in acetone, soluble in water, alcohol and chloroform and insoluble in ether and benzene.

*Analysis.* — $C_{22}H_{26}O_6N_2$: Molecular weight=414.44. Calculated: C, 63.75%; H, 6.32%; N, 6.76%. Found: C, 63.6%; H, 6.3%; N, 6.6%.

The product is not described in the literature.

EXAMPLE X

*Preparation of 1-hydroxymethyl N-methyl colchiceinamide*

*Step A: Preparation of 1-formyl N-methyl colchiceinamide.—* 3 g. of N-methyl colchiceinamide having a slow melting point of 198–200° C. were dissolved in 25 cc. of methylene chloride and then 6 cc. of 1,1-dichloromethyl methyl ether followed by 2.5 cc. of stannic chloride were added. The reaction mixture was triturated for a period of 30 minutes and then was allowed to stand for a period of three hours at room temperature. Water was added in order to decompose the complex. The aqueous phase was extracted with methylene chloride and the extract was washed with water and distilled to dryness to obtain a residue of raw 1-formyl N-methyl colchiceinamide.

This compound is not described in the literature.

*Step B: Preparation of 1-hydroxymethyl N-methyl colchiceinamide.—* The product obtained in Step A was directly reduced by 300 mg. of potassium borohydride in 60 cc. of methanol at 20° C. for a period of two hours. The reaction mixture was neutralized with acetic acid, and poured onto ice. The aqueous phase was extracted with methylene chloride containing 20% of methanol and the extract was distilled to dryness and the residue was taken up by a mixture of ethyl acetate and methylene chloride. After crystallization, 1-hydroxymethyl N-methyl colchiceinamide having a melting point of 250° C., and a specific rotation $[\alpha]_D^{20} = -192° \pm 5°$ (c. =0.5% in ethanol) was obtained.

The product occurred in the form of yellow prisms which were slightly soluble in water, dilute aqueous acids and alkalis and very slightly soluble in benzene, soluble in alcohol, acetone and chloroform and insoluble in ether.

*Analysis.*—$C_{23}H_{28}O_6N_2$: Molecular weight=428.47. Calculated: C, 64.47%; H, 6.59%; N, 6.54%. Found: C, 64.4%; H, 6.4%; N, 6.3%.

The compound is not described in the literature.

EXAMPLE XI

*Preparation of 1-hydroxymethyl N,N-dimethyl colchiceinamide*

*Step A: Preparation of 1-formyl N,N-dimethyl colchiceinamide.—* 0.5 g. of N,N-dimethyl colchiceinamide (having a slow melting point of 156° C.) were dissolved in 5 cc. of methylene chloride and 1.5 cc. of 1,1-dichloromethyl methyl ether followed by 0.4 cc. of stannic chloride were added thereto. After three hours, the complex was decomposed with water. The aqueous phase was extracted with methylene chloride and the extract was washed with water and distilled to dryness to obtain 0.52 g. of a residue of raw 1-formyl-N,N-dimethyl colchiceinamide.

This compound is not described in the literature.

*Step B: Preparation of 1-hydroxymethyl N,N-dimethyl colchiceinamide.—* 0.52 g. of raw 1-formyl N,N-dimethyl colchiceinamide obtained according to Step A was dissolved in 10 cc. of methanol. 55 mg. of potassium borohydride were added thereto and the reaction mixture was agitated at 20° C. for a period of two hours. The reaction mixture was neutralized with acetic acid and poured into water. The aqueous phase was extracted with methylene chloride and the extract was distilled to dryness and the residue was crystallized from a mixture of methylene chloride and ethyl acetate to obtain 1-hydroxymethyl N,N-dimethyl colchiceinamide having a melting point of 170° C. and a specific rotation $[\alpha]_D^{20} = +301° \pm 4°$ (c.=0.3% in chloroform).

The product occurred in the form of brilliant yellow crystals which were slightly soluble in water and dilute alkalis, soluble in dilute acids, alcohol, acetone and chloroform and insoluble in ether.

*Analysis.*—$C_{24}H_{30}O_6N_2$: Molecular weight=442.50. Calculated: C, 65.14%; H, 6.83%; N, 6.33%. Found: C, 65.1%; H, 6.9%; N, 6.0%.

This compound is not described in the literature.

EXAMPLE XII

*Preparation of the morpholide of 1-hydroxymethyl colchiceine*

Step A: *Preparation of the morpholide of 1-formyl colchiceine.*—1 g. of colchicine, 4 cc. of ethanol and 1.5 cc. of morpholine were mixed and allowed to stand at rest at 20° C. for a period of 4 days. Then the reaction mixture was distilled to dryness under vacuum to form 1.12 gm. of the raw morpholide of colchiceine which was utilized directly for the formylation. 1.1 g. of the morpholide of colchiceine were introduced into 15 cc. of methylene chloride. 3 cc. of 1,1-dichloromethyl methyl ether, then 0.9 cc. of stannic chloride were added. The reaction mixture was allowed to stand at room temperature for a period of 4 hours and then the complex was decomposed with water. The aqueous phase was extracted with methylene chloride. The extract was washed with water and distilled to dryness under vacuum to obtain a residue of the raw morpholide of 1-formyl colchiceine.

This compound is not described in the literature.

Step B: *Preparation of the morpholide of 1-hydroxymethyl colchiceine.*—The raw morpholide of 1-formyl colchiceine obtained in Step A was taken up with 20 cc. of methanol and 120 mg. of potassium borohydride were added thereto at 20° C. The reaction mixture was agitated for a period of two hours, neutralized with acetic acid and the morpholide of 1-hydroxymethyl colchiceine was extracted with chloroform.

The product is not described in the literature.

EXAMPLE XIII

*Preparation of 1-hydroxymethyl colchiceinamide*

3 g. of 1-hydroxymethyl colchicine were dissolved in 15 cc. of water and after 45 cc. of concentrated ammonium hydroxide solution were added thereto, the reaction mixture was allowed to stand for a period of 20 hours at room temperature. The product formed was vacuum filtered, washed with water and acetone and dried. After crystallization from a mixture of methanol and ether, 1-hydroxymethyl colchiceinamide having a melting point of 238–240° C., and a specific rotation $[\alpha]_D^{20} = -157° \pm 7°$ (c.=0.15% in chloroform) was obtained.

The product was identical to that described in Example IX.

EXAMPLE XIV

*Preparation of 1-hydroxymethyl N-methyl chlchiceinamide*

1 g. of 1-hydroxymethyl colchicine was dissolved in 20 cc. of water and 20 cc. of a 40% aqueous solution of monomethyl amine were added thereto. The solution was allowed to stand at room temperature for a period of 22 hours and then was poured into water saturated with sodium chloride. The aqueous phase was extracted with methylene chloride containing 20% of methanol. The extract was washed, dried over magnesium sulfate and evaporated to dryness under vacuum. The product was crystallized from a mixture of methylene chloride and ethyl acetate to obtain 1-hydroxymethyl N-methyl colchiceinamide melting at 250° C. which was identical to the product described in Example X.

EXAMPLE XV

*Preparation of 1-hydroxymethyl N,N-dimethyl colchiceinamide*

2 g. of 1-hydroxymethyl colchicine were dissolved in 20 cc. of water and 20 cc. of a 40% aqueous solution of dimethyl amine were added thereto. The solution was allowed to stand at room temperature for a period of 21 hours and then was poured into water saturated with sodium chloride. The aqueous phase was extracted with methylene chloride containing 20% methanol. The extract was washed, dried over magnesium sulfate and evaporated to dryness under vacuum and the residue was dissolved in methylene chloride and subjected to chromatography through a column of alumina. On elution with methylene chloride containing 1% of methanol and crystallization from ethyl acetate, 1 g. (48% yield) of 1-hydroxymethyl N,N-dimethyl colchiceinamide having a melting point of 170° C. was obtained.

The product was identical to the compound described in Example XI.

EXAMPLE XVI

*Preparation of the morpholide of 1-hydroxymethyl colchiceine*

1.5 g. of 1-hydroxymethyl colchicine were dissolved in 22 cc. of water and 40 cc. of a 40% aqueous solution of morpholine were added thereto. The solution obtained was allowed to stand at room temperature for a period of 20 hours and then it was poured into water saturated with sodium chloride. The aqueous phase was extracted with methylene chloride containing 20% of methanol. The extract was washed, dried over magnesium sulfate and evaporated to dryness under vacuum. The residue represented the morpholide of 1-hydroxymethyl colchiceine, identical to the product obtained in Example XII.

Pharmacological data (A) *Antimitotic activity.*—The antimitotic activity of 1-hydroxymethyl thiocolchicine, 1-methoxymethyl thiocolchicine, 1-hydroxymethyl colchicine, 1-hydroxymethyl N-methyl colchiceinamide and the acetate of 1-hydroxymethyl colchicine was studied according to the method of Jequier et al. (Arch. Int. Pharmacodyn. vol. 103, 1955, p. 243).

The Jequier et al. method is based on the fact that in rats the mitotic index of the marrow of the femoral bones (cells in mitosis/total number of cells) is the same on smears taken from diverse regions and on several areas of the same smear. The mitotic index is normally between 10 and 20 cells per 1000 cells. After subcutaneous injection of an antimitotic colchicinic compound such as colchicine, the division of cells is blocked at an intermediary stage of mitosis and the mitotic index is increased and obtains its maximum towards the sixth hour. The increase observed is a function of the dose administered and the correlation is clearly shown by a curve in the form of an S whose point of inflection is situated around the mitotic index of 100. The 100 antimitotic dose (DAM 100) which is that dose which furnishes 100 mitosis for 1000 cells is a measure of the stathmocinetic activity of the product administered.

The method consisted of subcutaneously injecting groups of 2 or 3 rats with varying doses of the compounds studied with the volume injected always being 0.2 cc. per 100 gm. of body weight. The animals were sacrificed six hours after injection and the marrow of the fermorale bones was separated. Smears of the marrow were prepared and colored with the May Grünwald-Giemsa Stain. 1000 cells were counted on each smear and the DAM 100 was determined from graphs representing the mitotic index found as a logarithmic function of the dose. The results are shown in Table I.

TABLE I

| Compound studied: | DAM 100 dose in mg./kg. |
|---|---|
| Colchicine | 0.7 |
| 1-hydroxymethyl colchicine | 12.0 |
| 1-hydroxymethyl thiocolchicine | 9.5 |
| 1-methoxymethyl thiocolchicine | 20.0 |
| 1-hydroxymethyl N-methyl colchiceinamide | 4.0 |
| The acetate of 1-hydroxymethyl colchicine | 13.0 |

(B) *Toxicity determination.*—The toxicity test was effected on mice of the Rockland strain weighing between 18 and 22 grams by injecting intraperitoneally groups of mice with increasing doses of the products tested in solution in physiological serum. The animals were held under observation for one week and the lethal dose ($DL_{50}$) for the products was determined by the graphic method of Miller et al. (Proc. Soc. Exp. Biol. Med., vol. 57, 1944, p. 261). From this, the therapeutic index or margin ($DL_{50}/DAM_{100}$) was calculated. The results are summarized in Table II.

TABLE II

| Compound Studied | $DL_{50}$, mg./kg. | Therapeutic Index |
|---|---|---|
| Colchicine | 2 | 2.8 |
| 1-hydroxymethyl colchicine | 670 | 56.0 |
| 1-hydroxymethyl thiocolchicine | 300 | 31.6 |
| 1-methoxymethyl thiocolchicine | 100 | 5.0 |
| 1-hydroxymethyl N-methyl colchiceinamide | 200 | 50.0 |
| The acetate of 1-hydroxymethyl colchicine | 500 | 38.5 |

As can be seen from Table II, the therapeutic margins for the novel derivatives of the invention are clearly more favorable than the therapeutic margin of colchicine.

Various modifications of the process and compositions of the invention may be made without departing from the spirit or scope thereof, and it is to be understood that the invention is intended to be limited only as defined in the appended claims.

We claim:
1. 1-hydroxymethyl colchicine.
2. 1-hydroxymethyl thiocolchicine.
3. 1-methoxymethyl thiocolchicine.
4. The formate of 1-hydroxymethyl colchicine.
5. The formate of 1-hydroxymethyl thiocolchicine.
6. The acetate of 1-hydroxymethyl colchicine.
7. The acetate of 1-hydroxymethyl thiocolchicine.
8. The propionate of 1-hydroxymethyl colchicine.
9. The propionate of 1-hydroxymethyl thiocolchicine.
10. The hexahydrobenzoate of 1-hydroxymethyl colchicine.
11. The mixed carbonate of hexahydrobenzyl alcohol and 1-hydroxymethyl colchicine.
12. 1-hydroxymethyl colchiceinamide.
13. 1-hydroxymethyl N-methyl colchiceinamide.
14. 1-hydroxymethyl N,N-dimethyl colchiceinamide.
15. The morpholide of 1-hydroxymethyl colchiceine.
16. A colchicine derivative of the formula

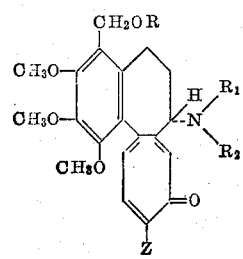

wherein R is selected from the group consisting of hydrogen, alkyl of 1 to 3 carbon atoms, acyl of an organic carboxylic acid having 1 to 18 carbon atoms and acyl of an organic carbonic acid having 1 to 18 carbon atoms, $R_1$ is selected from the group consisting of hydrogen and alkyl of 1 to 3 carbon atoms, $R_2$ is selected from the group consisting of hydrogen and acyl of an organic carboxylic acid having 1 to 24 carbon atoms, and Z is selected from the group consisting of $-OCH_3$ $-OCH_2-CH_3$ $-SCH_3$, $-SCH_2-CH_3$ and

wherein R' and R" are selected from the group consisting of hydrogen and alkyl having 1 to 8 carbon atoms and R' and R" together with the nitrogen atom to which they are attached from morpholino.

17. A colchicine derivative of the formula

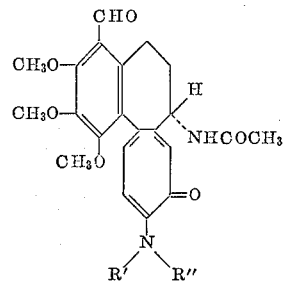

wherein R' and R" are selected from the group consisting of hydrogen and alkyl having 1 to 8 carbon atoms and R' and R" together with the nitrogen atom to which they are attached form morpholino.

References Cited by the Examiner

UNITED STATES PATENTS

| 1,915,334 | 6/1933 | Salzberg et al. | 260—243 |
| 2,075,359 | 3/1937 | Salzberg et al. | 167—22 |
| 2,742,464 | 4/1956 | Koebner et al. | 260—247.2 |
| 2,857,422 | 10/1958 | Fischet et al. | 260—488 |
| 2,941,002 | 6/1960 | Ehrhart et al. | 260—562 |
| 2,957,022 | 10/1960 | Cohen | 260—468 |
| 3,105,012 | 9/1963 | Brandon et al. | 167—78 |
| 3,106,514 | 10/1963 | Slater | 167—78 |
| 3,194,835 | 7/1965 | Muller | 260—554 |

OTHER REFERENCES

Gaylord: "Reduction With Complex Metal Hydrides," Interscience Publishers, Inc., page 118 (1956).

ALEX MAZEL, *Primary Examiner.*

HENRY R. JILES, N. S. RIZZO, *Examiners.*

J. TOVAR, *Assistant Examiner.*